United States Patent [19]
Knapp

[11] Patent Number: 5,507,314
[45] Date of Patent: Apr. 16, 1996

[54] MIXER VALVE HAVING A BALL VALVE ELEMENT

[75] Inventor: Alfons Knapp, Biberach/Riss, Germany

[73] Assignee: Masco Corporation, Taylor, Mich.

[21] Appl. No.: 157,186

[22] PCT Filed: Oct. 22, 1991

[86] PCT No.: PCT/US91/07816

§ 371 Date: Dec. 8, 1993

§ 102(e) Date: Dec. 8, 1993

[87] PCT Pub. No.: WO92/22765

PCT Pub. Date: Dec. 23, 1992

[30] Foreign Application Priority Data

Nov. 6, 1991 [IT] Italy ................... TO91A0439

[51] Int. Cl.$^6$ ............... F16K 11/076; F16K 11/087
[52] U.S. Cl. ................... 137/625.41; 137/636.3; 251/287
[58] Field of Search ............ 137/625.17, 625.4, 137/625.41, 636.2, 636.3, 454.6; 251/287

[56] References Cited

U.S. PATENT DOCUMENTS

| | | | |
|---|---|---|---|
| 2,592,062 | 4/1952 | Perry | 137/625.41 |
| 2,687,872 | 8/1954 | Onosko | 251/287 |
| 2,911,009 | 11/1959 | Parker | 137/625.41 |
| 3,056,418 | 10/1962 | Adams et al. | 137/625.41 X |
| 3,384,121 | 5/1968 | Spencer | 137/625.41 |
| 3,417,783 | 12/1968 | Manoogian et al. | 137/625.41 X |
| 3,433,264 | 3/1969 | Parkison | 137/625.17 |
| 3,590,876 | 7/1971 | Young | 137/625.41 X |
| 3,674,048 | 7/1972 | Manoogian et al. | 137/625.41 X |
| 3,872,890 | 3/1975 | Hare | 137/625.41 |
| 3,882,897 | 5/1975 | Manoogian et al. | 137/636.3 X |
| 3,915,195 | 10/1975 | Manoogian et al. | 137/625.41 |
| 4,043,359 | 8/1977 | Christo | 137/625.41 |
| 4,200,123 | 4/1980 | Brandelli | 137/625.4 |
| 4,243,063 | 1/1981 | Parkison | 137/625.41 X |
| 4,305,419 | 12/1981 | Moen | 137/625.41 X |
| 4,325,403 | 4/1982 | Uhlmann | 137/454.6 X |
| 4,352,369 | 10/1982 | Lorch | 137/625.41 X |
| 4,387,738 | 6/1983 | Bisonaya | 137/801 |
| 4,449,551 | 5/1984 | Lorch | 137/625.41 |
| 4,573,493 | 3/1986 | Hammarstedt | 137/625.41 X |
| 4,696,322 | 9/1987 | Knapp et al. | 137/625.41 X |
| 5,040,566 | 8/1991 | Orlandi | 137/625.41 |

FOREIGN PATENT DOCUMENTS

| | | |
|---|---|---|
| 7707977 | of 0000 | France . |
| 1550391 | of 1965 | Germany . |
| 2246763 | 9/1972 | Germany . |
| 1179942 | 2/1967 | United Kingdom . |
| 1508763 | 2/1977 | United Kingdom . |

Primary Examiner—John Rivell
Attorney, Agent, or Firm—Reising, Ethington, Barnard & Perry

[57] ABSTRACT

A ball type mixer valve (20) has a housing (25) and a ball valve element (11) mounted for pivotable motion about a longitudinal axis (A) of the housing (25) and a second perpendicular axis (B) that is fixed with respect to the ball valve element (11). The ball valve element has a control stem (10) extending therefrom and a pin (15) extending at a substantially perpendicular angle from the control stem. Two distal ends (16 and 17) of pin (15) form pivots which are received in slots (7) formed in the valve housing to position the ball vertically in the housing and allow the motion of the ball about the two defined axes.

33 Claims, 4 Drawing Sheets

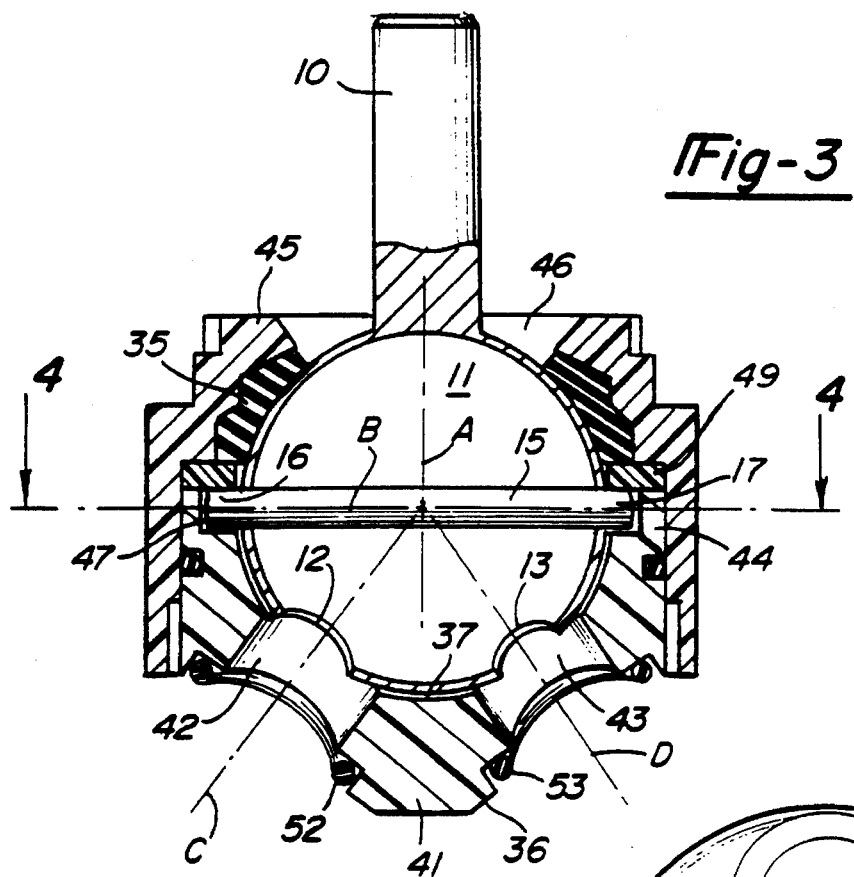
Fig-3
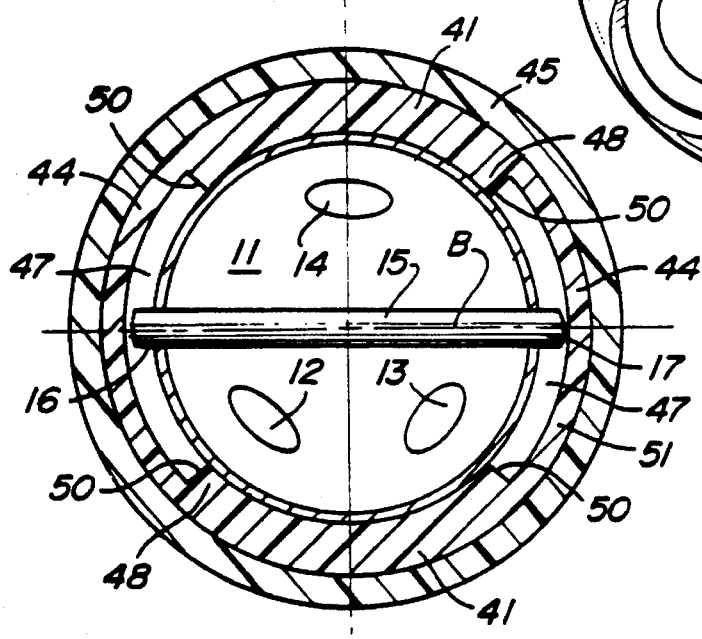
Fig-4
Fig-5

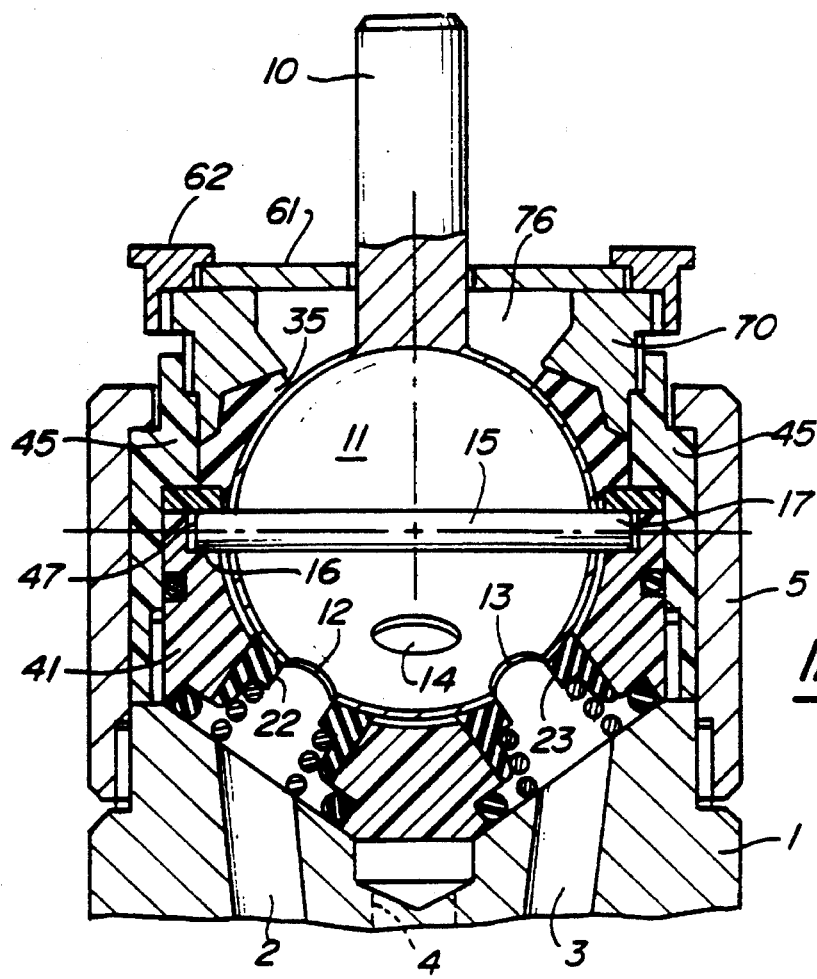
*Fig-8*
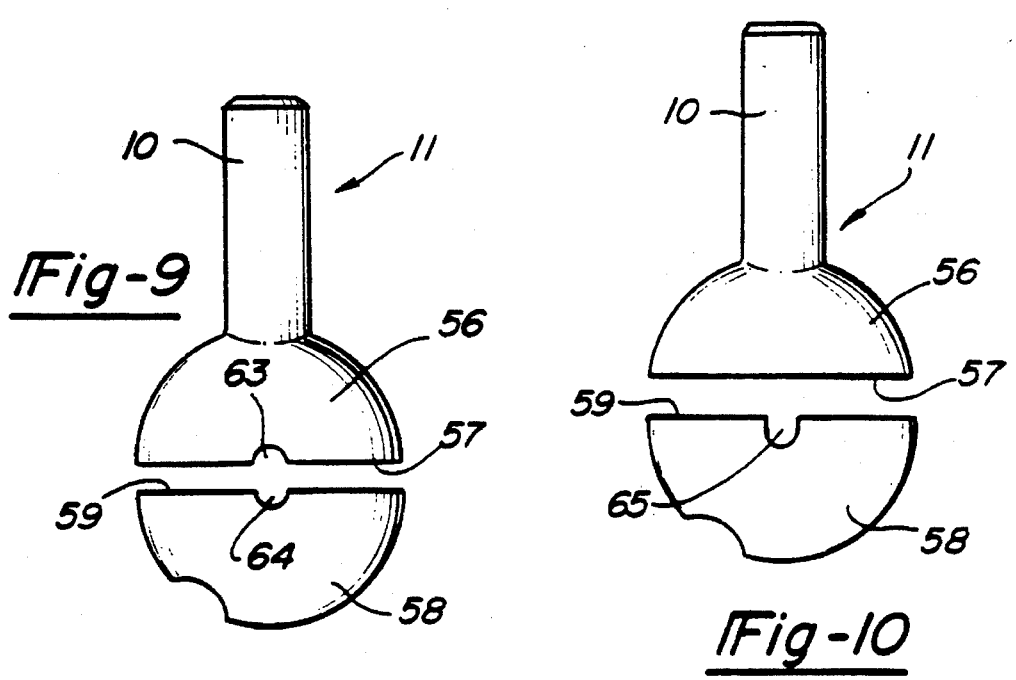
*Fig-9*
*Fig-10*

5,507,314

MIXER VALVE HAVING A BALL VALVE ELEMENT

TECHNICAL FIELD

This invention relates to a mixer valve for liquids incorporating a ball valve element and more particularly to a ball valve mechanism that has pivotable motion about a fixed longitudinal axis of the valve body.

BACKGROUND OF THE INVENTION

Single handle faucets, commonly referred to as mixer valves, that control both hot and cold water flow have seen vast consumer acceptance. These faucets are commonly constructed such that a handle or knob is movable in two distinct directions to adjust the mix of hot and cold water and to adjust the volume or flow rate.

The two basic types of mixer valves that have seen widest commercial acceptance are plate valves and ball valves. While ball valves offer a reliable one piece construction that is durable and easily assembled, plate valves offer a drive mechanism that allows motion of the handle in two desirable directions that appears to be universally accepted by the consumer. This desirable handle motion allows for an orbiting motion of the handle about a fixed longitudinal axis of the valve body and a rocking, i.e. pivoting, motion about a movable horizontal axis relative to the valve body. The horizontal axis is fixed with respect to the handle and is perpendicular to the longitudinal axis of the valve body. The one distinguishing characteristic of this type of handle motion is that when the handle is pivoted to an off position, the desired mix ratio of hot and cold water can be remembered by the location of the handle so that when the faucet is turned back on, the same mix of hot and cold water flows through the faucet.

Recently, ball valves have been devised that allow the handle to be operated in the same fashion as the commercially accepted plate type mixer valve. These ball type mixer valves require the introduction of another moving part in the form of a rotatable plate mounted above the ball valve element. Furthermore, these ball valves have been combined with plate devices which can be adjustably positioned about a cover opening through which the handle controls the ball valve to limit the total flow rate. Alternately or in addition, these limiting devices limit the maximum ratio of hot water to cold water and consequentially the maximum temperature of the mixed water at the outlet.

Various disadvantages arise when a ball valve is constructed such that its stem moves similarly to most plate type mixer valves. In particular, the ball valve element is mounted between elastomeric inlet seals positioned about the inlet ports of the vale body and a sealing gasket that is mounted under the valve cover or cap. The elastomeric inlet seals and gasket are all yielding and render a floating characteristic to the ball valve element between the valve body and cap. There is no positive lock or locator mechanism that securely positions the ball valve in place. Because the ball valve can be moved in a translational manner against the elastomeric elements, the operator when operating the handle can also move the handle a small amount in any direction including directions not contemplated in the design of the mixing valve. This unwanted motion renders a undesirable spongy feel to the operation of the faucet and an uncertainty to the operator as to the proper operation of the faucet. Furthermore, the spongy feel of the handle gives the impression that the handle is unstable and not assembled properly.

In order to reduce these disadvantages, a regulation ring has been incorporated in many ball valve mixing valves. The regulation ring is adjustably screwed onto the valve cap. The regulation ring pushes the sealing gasket downward against the ball valve element which in turn is pressed against the inlet seals. The downward placement of the sealing gasket and ball valve element reduces the undesirable motion but does not eliminate it. Furthermore, the combining of the regulation ring with known guide mechanisms which limit the handle's directional movement and with plate devices which limit the flow rate and temperature is unduly complicated and expensive.

What is needed is a ball valve type mixer valve that duplicates the handle motion of known plate valves that provide for swinging of the handle about the longitudinal axis of the valve body while retaining the advantage of having only one movable piece to operate the valve, in other words, without the introduction of a separate moving part. What is also needed is a ball valve assembly of the described type that eliminates the need for a regulation ring and provides for a valve that eliminates the possibility of the handle moving in a fashion that is different from that needed for its proper operation.

SUMMARY OF THE DISCLOSURE

In accordance with one aspect of the invention, a mixer valve for liquids has a ball valve pivotably mounted in a valve receiving cavity of a housing. The cavity is in fluid communication with a plurality of inlet ports and at least one outlet port. The ball valve has at least a partially spherical surface and a plurality of openings in said surface. The openings cooperate with the ports to control fluid flow through the ports. The valve housing has a control opening with the longitudinal axis of the valve housing passing through the control opening. The ball valve has a first projection extending through the control opening and functions as a control stem or valve handle. The ball valve has a second projection extending therefrom and engages a slot in the valve body. The slot and second projection are positioned and angled such that the ball valve is constrained to pivotable motion about the longitudinal axis and about an axis perpendicular to one longitudinal axis.

Preferably, the second projection is perpendicular to the first projection with its axis intersecting the center of the ball valve. The slot is formed between a valve base member and valve cover and has its axis lying in a plane perpendicular to handle the longitudinal axis of the valve housing.

According to another aspect of the invention, a ball valve has at least a partially spherical valve surface. The ball valve has a first projection extending therefrom for driving the ball valve when mounted in a valve housing. One of the ball valve or housing has a second projection extending therefrom that is constructed to constrain the motion of the ball valve in certain directions when mounted in a valve housing. In one embodiment the second projection is formed by a pin passing through the ball valve and having at least one distal end positioned to the exterior of the at least partially spherical valve surface. In one embodiment the pin has two distal ends projecting to the exterior of the valve surface and being positioned one hundred and eighty degrees apart on the valve surface. The pin passes through the center of the ball valve. Each pin end is received in a horizontally disposed slot of the housing. Each slot is perpendicular to the longitudinal axis of the valve housing. Preferably, the pin is cylindrical and is pivotable within the horizontal slots. The slots have a width and the pin has a diameter that provides relatively little clearance along the direction of the valve longitudinal axis such that the ball valve is fixed with respect to the valve housing along the longitudinal axis.

In accordance with a broader aspect of the invention, one of the ball valve and valve housing includes a mechanism affixed thereto that constrains the motion of the ball valve element with respect to the valve housing about a longitudinal axis of the housing and about an axis of the ball valve that is perpendicular to the longitudinal axis.

According to another aspect of the invention, a ball valve is received in a valve cavity defined by upper and lower valve body members that form a cartridge that is receivable in a valve base member. The valve lower body member has at least two inlet ports each having an axis that intersects the center of the ball valve. The lower valve body member has a lower surface that lies in a contour surface which intersects the longitudinal axes of the ports at a perpendicular angle. Preferably, the contour has a frustum shape and the valve base member has a complementarily shaped surface to seat the lower outer surface of the lower body member. The base member has inlet ports and an outlet port aligned with respective ports of the lower valve body member. The cartridge has the two slots defined between the junction of the lower and upper body members. The ball valve has a pin passing therethrough and engaging the two slots.

With the above mentioned arrangement, the ball valve element is allowed to freely rotate around the axis of the cylindrical pin when the control stem is tilted. The ball valve is also allowed to rotate about the longitudinal axis of the valve housing when the control stem is similarly rotated. On the other hand, the ball valve member cannot vertically move due to the small clearance between the slot and pin. This arrangement eliminates any rocking motion of the handle in a direction other than in its intended fashion.

BRIEF DESCRIPTION OF THE DRAWINGS

Reference now is made to the accompanying drawings in which:

FIG. 3 is a side elevational and segmented view of another embodiment disclosing a cartridge for a mixer valve;

FIG. 4 is a cross-sectional view taken along line 4—4 shown in FIG. 3;

FIG. 5 is a bottom plan view of the lower body member shown in FIG. 3;

FIG. 8 is a view similar to FIG. 6 disclosing a third embodiment;

FIG. 9 is an exploded and schematic view of a ball valve element shown in FIG. 1; and FIG. 10 is a view similar to FIG. 9 disclosing a second embodiment of the ball valve element.

DETAILED DESCRIPTION OF THE PREFERRED EMBODIMENTS

Figure 1:
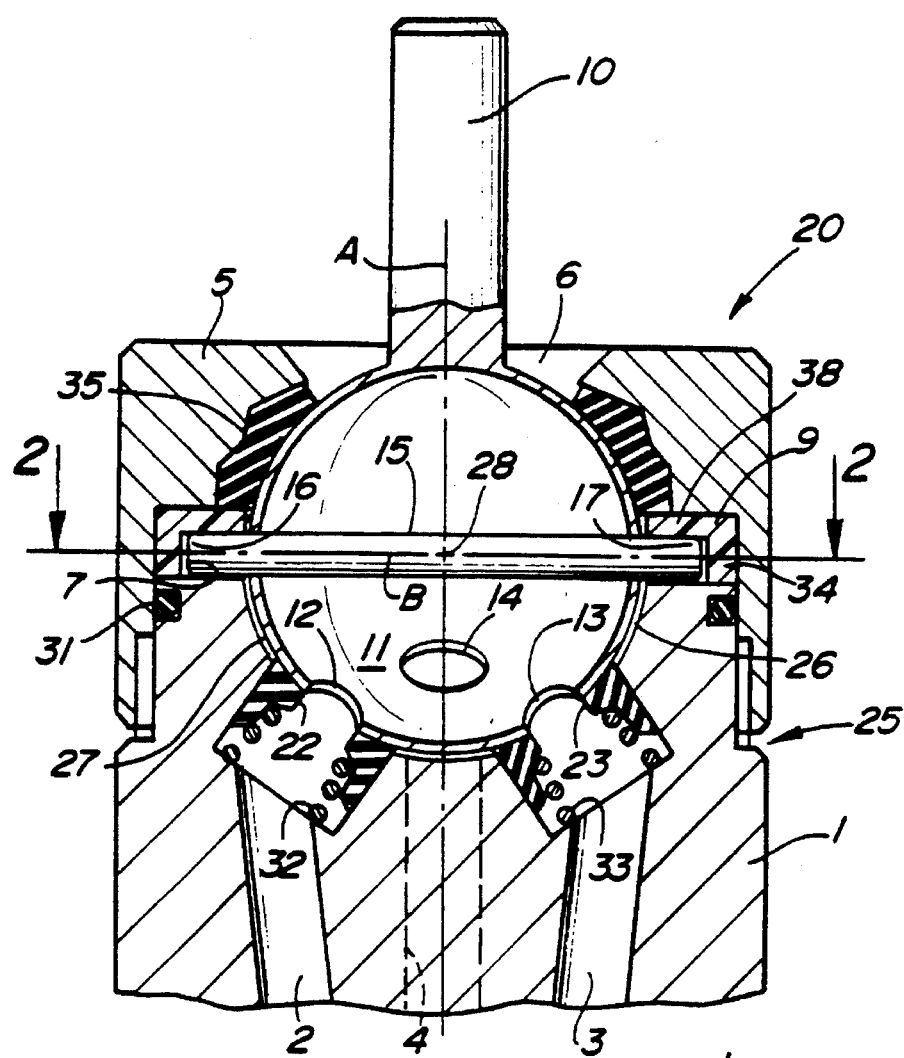
FIG. 1 is a side elevational and segmented view of a mixer valve illustrating one embodiment of the invention.
Figure 2:
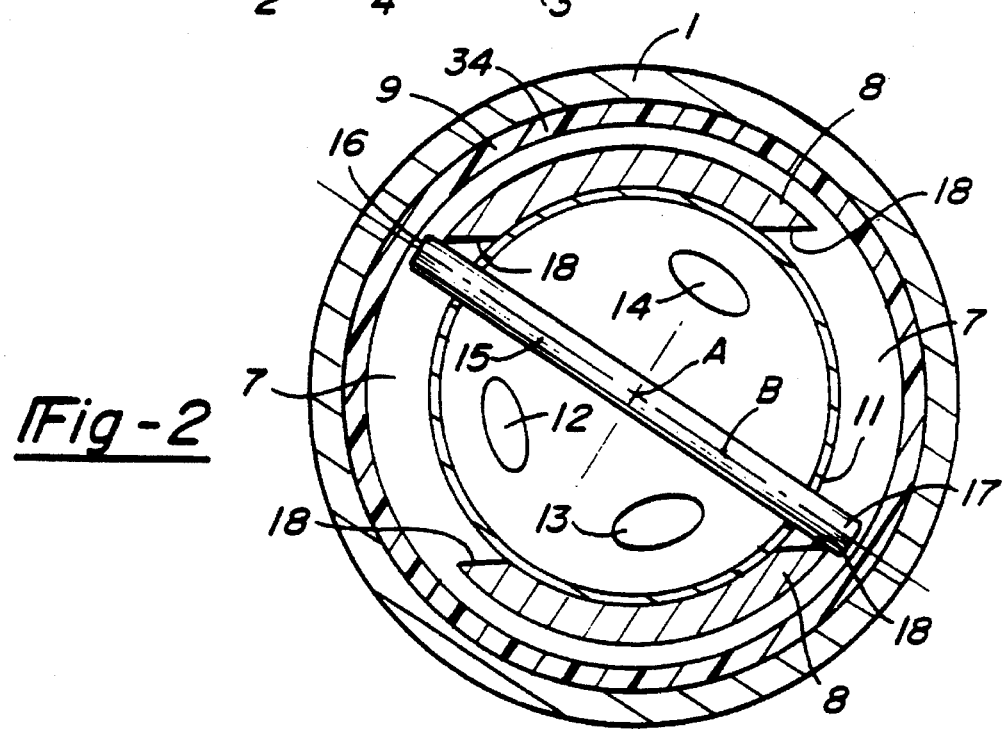
FIG. 2 is a cross-sectional view taken along line 2—2 shown in FIG. 1.

Referring to FIGS. 1 and 2, a mixing valve 20 includes a valve housing 25 that is formed from a lower base member 1 and a cover 5. The base member has two inlet ports 2 and 3 for hot and cold water and has an outlet port 4 for the passage of mixed water. The cover 5 is screwed onto the base member 1 to form a valve cavity 26 that is substantially spherical in shape to receive a ball valve element 11. The valve housing has a longitudinal axis A that passes through the cavity 26.

The ball valve element 11 has a substantially spherical valve surface 27 with openings 12, 13 and 14 therethrough which cooperate with the inlet ports 2 and 3 and outlet port 4 respectfully to regulate the passage of water from the two inlet ports 2 and 3 to the outlet port 4 by regulating the mixture ratio from the two inlet ports 2 and 3 and the flow rate, i.e. volume of total water per unit time. The valve cover 5 has a control opening 6 therethrough. The cover 5 is positioned such that the longitudinal axis A of the housing passes through the control opening 6. A control stem 10 extends through the control opening 6. The control stem 10 is fixedly connected to the ball valve element 11. The control stem 10 is constructed to be attached to a faucet handle (not shown) in a conventional fashion. The downstream ends of ports 2 and 3 are counter-bored to form a seat for two biasing springs 32 and 33 which bias tubular elastomeric sealing elements 22 and 23 against the ball valve surface 27. A sealing gasket 35 is interposed between the ball valve 11 and the valve cover 5 about control opening 6.

The ball valve element 11 also has a cylindrical pin 15 extending therethrough with its distal ends 16 and 17 positioned to the exterior of valve surface 27. The pin 15 is positioned to intersect the center 28 of ball valve 11 and lie perpendicular to control stem 10. The pin can be welded in place as described in more detail later. Each distal end 16 and 17 is positioned in a circumferentially disposed slot 7 formed between base member 1 and cover 5. Each slot 7 has a central axis disposed in a plane perpendicular to axis A. Because the ends 16 and 17 are cylindrical in shape, they have a circular cross-section that allows them to pivot in slots 7. The base member 1 has an upright collar 8 that is milled out at two circumferential positions. The circumferential ends 18 of the collar sections 8 form stop shoulders 18 for the distal ends 16 and 17. An angular ring 9 having a circumferential wall 34 and flat top wall 38 is placed over the collar 8 and distal ends 16 and 17. The ring 9 is retained in place by cover 5. Ring 9 and base member 1 may be constructed such that ring 9 snap fits onto base member 1. The slots 7 are vertically dimensioned to form only enough clearance to allow sliding movement of the pin 15 in slot 7. Desirably no vertical spacing exists between slot 7 and the ends 16 and 17. A conventional ring seal 31 is operably interposed between the base member 1 and cover 5.

The cylindrical distal ends 16 and 17 form a pivot axis B for ball valve element that is perpendicular to the longitudinal axis A of valve housing 25. Rocking of the control stem along a plane containing the longitudinal axis A pivots the ball valve element 11 about the pivot axis B independently of the rotated position of the ball valve member about axis A. Furthermore, the distal ends 16 and 17 may slide along slots 7 to allow the ball valve element 11 to rotate about axis A when the control stem 10 is swung about the longitudinal axis A.

The rotation of the ball valve element 11 about axis A is limited by the position of the stop shoulders 18 that abut the distal ends 16 and 17. Mixer valves having different applications may have different rotation angles established by the circumferential positioning of stop shoulders 18. The rotation of the ball valve element 11 as illustrated adjusts the ratio mix and thus the temperature of the discharged mixed water. As shown in FIG. 2, the distal ends 16 and 17 extend radially beyond collar 8 and end adjacent the circumferential wall 34 of angular ring 9. Alternately, the circumferential wall 34 or the upper wall 38 of the angle ring 9 may have the stop shoulders 18 affixed thereto. The ring 9 may be adjustably positioned in place to adjust the rotational extent of travel of ball valve element 11 about axis A. The stop shoulders 18 may extend radially inward from the circumferential wall 34 or depend downwardly from the upper wall 38 of angular ring 9 to abut ends 16 and 17. p The minimum clearance between ends 16 and 17 and slots 7 in the vertical direction prevents vertical displacement of the ball valve element 11 with respect to the valve housing 25. Consequently, the control stem does not show any instability or render a spongy feel to the operator when the ball is pivoted along its two prescribed pivotable directions. The need for a regulation ring intended to push down gasket 35 and ball valve element 11 is eliminated. Furthermore, any movable guide ring member that has previously been needed in control opening 6 to limit the degrees of motion of the control stem 10 is also eliminated.

FIGS. 3, 4, 5 and 6 illustrate a cartridge 30 for the invention which may be assembled in a valve housing 25 adapted to receive a cartridge 30. The cartridge 30 is formed from a lower body member 41 and upper body member 45 which may be manufactured from known plastic material suitable for faucet applications. The upper body member 45 is connected to the lower body member in known fashion such as screwing, snap fitting, or welding. The lower body member has cylindrical inlet ports 43 and 45 passing straight through a bottom section of the lower body member. The axes C and D of the ports 43 and 45 intersect the center 28 of the ball valve element 11. The lower body member also has a outlet duct 54 passing therethrough. The lower body member has a lower surface 36 that has a frustum shape. The inlet ports 43 and 45 and outlet duct 54 pass through lower frustum surface 36. The axes C and D intersect the frustum contour at a perpendicular angle. By having cylindrical ports 43 and 45 being perpendicular to frustum shaped surface 36 and arranged to intersect the center of ball valve element 11, the axes C and D of the ports 43 and 45 also intersect the contour of the cavity surface 37 at a right angle and provides conventional circular seal rings 22 and 23 and springs 32 and 33 to be operable within ports 43 and 45. The ports are straight with no bends and are easily molded into a body member 41 made from plastic.

Ports 42 and 43 are counter-bored to seat packing seals 52 and 53. The lower body member 41 has a peripheral upstanding circumferential wall 44 that has thin sections 51 and radially thicker sections 48. The thicker sections 48 form stop shoulders 50 at circumferential ends of slots 47 that are positioned radially inside the thin sections 51. Pin 15 of ball valve element 11 has a length to fit between the opposing thin sections 51 with only a slight clearance.

Figure 6:
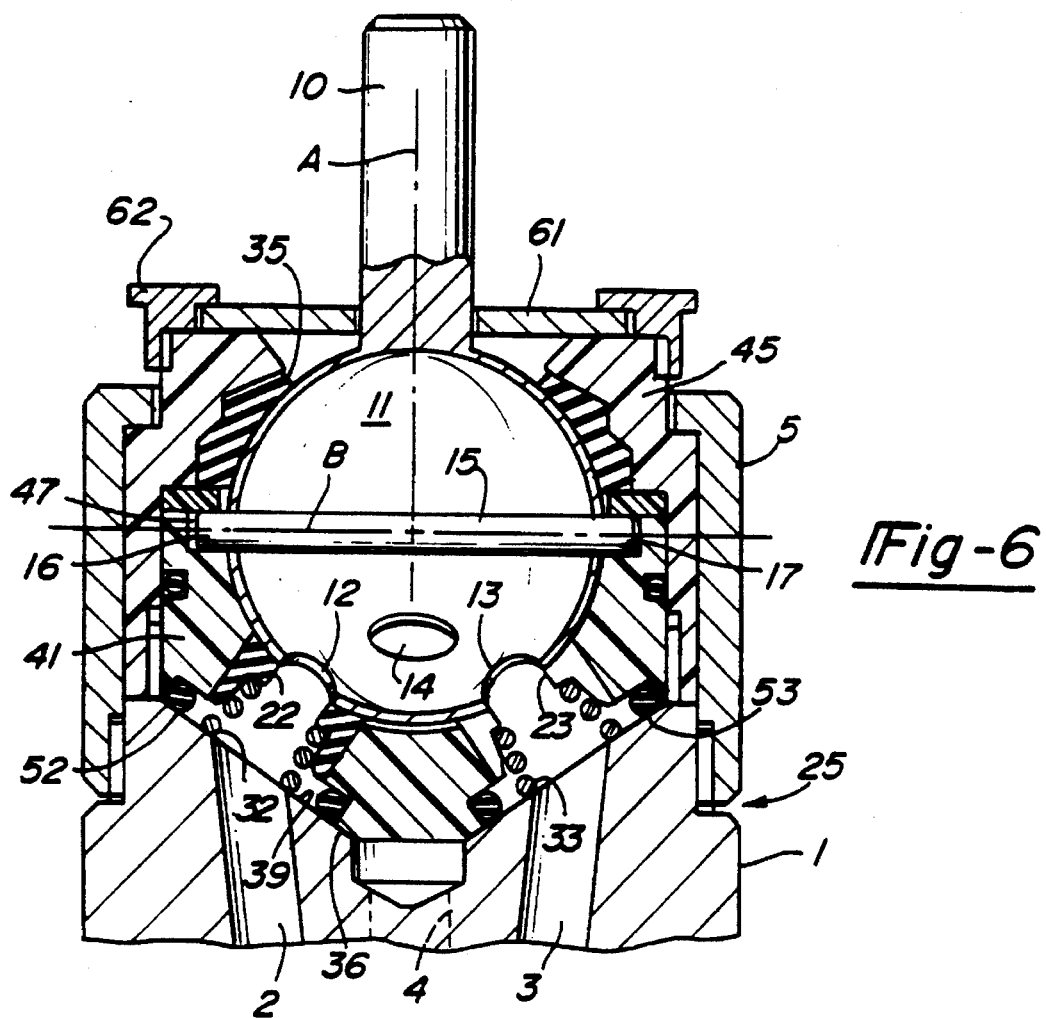
FIG. 6 is a side elevational and segmented view of the cartridge shown in FIG. 3 installed in a valve base member.
Figure 7:
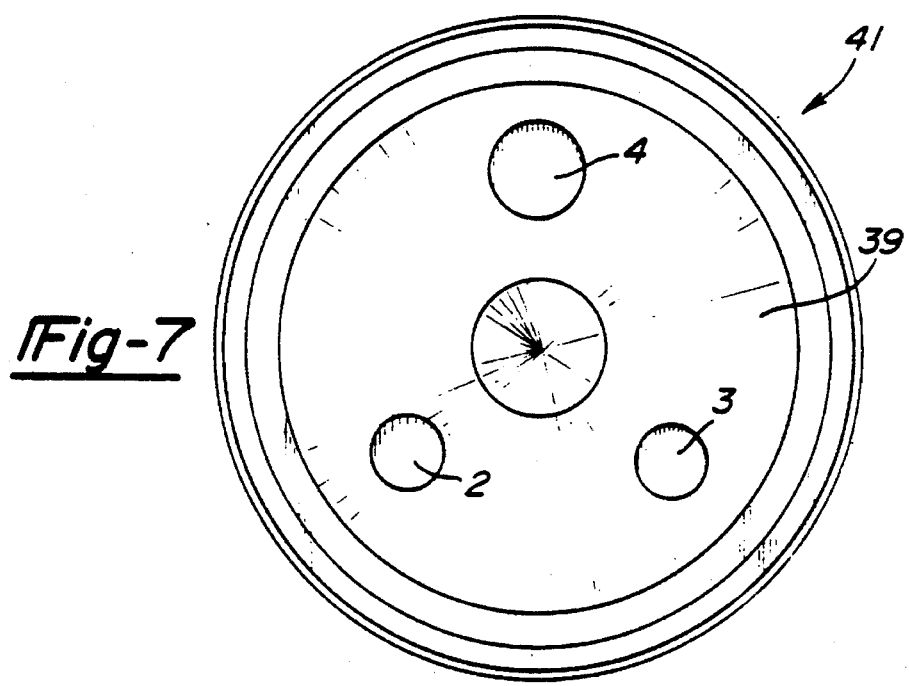
FIG. 7 is a top plan view of the valve base member shown in FIG. 6.

The slot 47 has its upper side defined by a flat ring 49 that is positioned at the top of peripheral wall 44 and interposed between lower body member 41 and upper body member 45. Control opening 46 passes through the upper body member 45. The cartridge 30, as shown in FIG. 6, is received in valve housing 26 which includes a valve base member 1 and cap 5. The outlet port 44 of cartridge 30 is aligned with port 4 in base member 1 and inlet ports 42 and 43 are aligned with inlet ports 2 and 3. The packing seals 52 and 53 create sealed inlet passages between the base member 1 and cartridge 30. Referring to FIGS. 6 and 7, the base member 41 has a frustum shaped surface 39 which seats the frustum shaped surface 36 of the lower body member 41. The surfaces 36 and 39 may have other complementary shapes other than a frustum as long as the contour intersects the axes C and D at substantially right angles.

An optional plate device 61 is mounted above the upper body member 45 to limit the angular displacement of ball valve element 11 and the corresponding movement of the control stem for limiting the maximum temperature and/or the maximum flow rate which may be discharged through outlet port 4. The known plate device 61 can be mounted by a retaining ring 62 which is screwed onto the upper body member 45.

In certain applications, it may be desirable to continue use of a regulation ring 70 as illustrated in FIG. 8. The regulation ring can be used where compensation is needed for possible defects in manufacturing tolerances. The control opening 76 in this embodiment extends through the regulation ring 70 which in turn is threaded onto the upper body member 45. The regulation ring when adjustably screwed into upper body member 45 presses down on sealing gasket 35 which abuts against ball valve element 11. The plate device 61 with its retaining ring 62 is also usable with the regulation ring. The retaining ring 62 is screwed onto the regulation ring 70.

Other variations are possible. It is foreseen that a plate device 61 or regulation ring 70 may be applied to a non-cartridge type valve and attached to the cover 5 rather that the upper body member 45. It is also foreseen that stop shoulders which limit the rotation of the ball valve about the longitudinal axis A may be incorporated into the cover 5 or upper body member 45. In such cases the ring 9 or ring 49 may be omitted.

The ball valve element may be constructed also in several foreseen ways. The pivot projections 16 and 17 may be separate members that are welded or otherwise adhered to the ball valve. The preferred method of inserting a pin 15 through the ball valve element offer several advantages. The pin needs to extend through corresponding holes 18 in the ball valve element. These holes may be drilled. However FIGS. 9 and 10 illustrate two ways which eliminate the need for drilling. FIG. 9 illustrates a ball valve member constructed from two drawn halves 56 and 58 that are then coupled together by welding. The bottom half 58 is preferably made from stainless steel. The mating edges 57 and 59 of each half include a pair of semi-circular notches 63 and 64 that when aligned and mated together form holes 18. The cylindrical stem 15 may be fixed in place by welding, press fit, adhesion or may be left free to pivot about in holes 18.

The modification shown in FIG. 10 shows a deeper notch 65 shown in lower half 58 only. This notch is deep enough to receive the cylindrical pin 15. In this fashion, the upper half 56 does not need to be notched. Because the equatorial region of the ball valve element 11 is not operative for valve purposes, the region may be distorted for assembly purposes into a cylindrical region that may have a radius smaller that the radius of the spherical portion of the valve surface.

In this fashion, an effective guide for a ball type mixer valve is inexpensively and simply incorporated in the valve. The invention obviates the disadvantages due to the floating characteristic of previously known ball valves and eliminates the installation difficulties of regulation plates and other plate devices needed in previously known ball type mixer valves. In addition, a ball type mixer valve can have its control stem move in the same fashion as known plate valves with one of the degrees of free movement being about the longitudinal axis of the valve housing without the addition of any separate moving parts. Furthermore, the ball type mixer valve according to the above described construction provides for a valve that can be easily modified to limit the maximum temperature or maximum flow rates by slight constructive modification in an economical manner.

Other variations and modifications are possible within the scope of the foregoing disclosure, drawings, and claims without departing from the spirit of the invention as defined by the appended claims.

The embodiments in which an exclusive property or privilege is claimed are defined as follows:

1. In a mixer valve for liquids having a ball valve pivotably mounted in a valve receiving cavity of a housing body, said body having a plurality of ports in fluid communication with said cavity, said ball valve having a plurality of openings in an outer at least partially spherical valve surface, said openings cooperating with said ports to control liquid flow through said ports, said valve body having a control opening therethrough with a longitudinal axis of said valve body passing through said control opening, said ball valve having a first projection in the form of a control stem connected thereto and extending through said control opening, the improvement comprising:

one of said valve body and said ball valve having a second projection extending therefrom and engaging a slot in the other of said valve body and said ball valve, said second projection and slot being positioned and angled such that said ball valve is constrained to pivotable motion about said longitudinal axis and about an axis perpendicular to said longitudinal axis.

2. In a mixer valve as defined in claim 1 further comprising:

said second projection extending from said ball valve.

3. In a mixer valve as defined in claim 2 further comprising:

said second projection being formed by a distal end of a pin that passes through said ball valve.

4. In a mixer valve as defined in claim 2 further comprising:

said slot being recessed in said valve body and having its central longitudinal axis disposed in a plane that is perpendicular to said longitudinal axis.

5. In a mixing valve as defined in claim 4 further comprising:

said pin being rigidly affixed to said ball valve.

6. In a mixing valve as defined in claim 4 further comprising:

said valve body including a valve cap being connected to a valve base member;

said valve cap having said access control opening therethrough;

said slot being defined between a junction of said valve cap and said valve base member; and said slot having a limited circumferential direction about said longitudinal axis of said valve body with shoulders at circumferential ends of said slot to define stops for movement of said second projection about said longitudinal axis.

7. In a mixer valve as defined in claim 6 further comprising:

said shoulders being formed by an annular upright collar of said valve base member having inwardly extending shoulders.

8. In a mixer valve as defined in claim 6 further comprising:

said shoulders being formed by a partially annular collar extending upright from said valve base member to said access control opening with circumferential ends of said collar being spaced apart to partially form said slot therebetween with opposing circumferential ends of said collar forming said shoulders to define said stops for said second projection.

9. In a mixer valve as defined in claim 1 further comprising:

said mixer valve being in cartridge form with a cartridge having a lower body member and upper body member connected together and defining said cavity for said ball valve; and said cartridge being received in a valve base member and retained therein by a valve cap member.

10. In a mixer valve as defined in claim 9 further comprising:

said lower body member having two inlet ports and an outlet port, each of said inlet ports having a longitudinal axis intersecting the center of said ball valve; and said lower valve body member having a lower outer surface with a contour such that a central axis of each inlet port intersects said lower outer surface contour at a perpendicular angle.

11. In a mixer valve as defined in claim 10 further comprising:

said lower outer surface being frustum shaped;

said valve base member having a complementarily shaped surface to seat said lower outer surface;

said valve base member having inlet ports and an outlet port in fluid aligned with the respective ports of said lower valve body member; and a seal operably positioned about each inlet and outlet port and interposed between said valve base member and said valve lower body member to form sealed passages through said valve base member and valve lower body member.

12. In a mixer valve as defined in claim 9 further comprising:

said slot being formed between said lower and upper valve body members; and said second projection extending from said ball valve.

13. In a mixer valve as defined in claim 12 further comprising:

a plate device constructed for limiting the control field of the valve being mounted to said upper body member of said cartridge.

14. In a mixer valve as defined in claim 9 further comprising:

a regulation ring constructed to control the pressure exerted on a gasket interposed between the ring and the ball valve being mounted on said upper valve body.

15. In a mixer valve in accordance to claim 14 further comprising:

said regulation ring having a mounting means for mounting a plate device constructed for limiting the control field of the valve.

16. In a mixer valve as defined in claim 1 further comprising:

a plate device constructed for limiting the control field of the valve being mounted in said access control opening.

17. In a mixer valve as defined in claim 1 further comprising:

a regulation ring constructed to control the pressure exerted on a gasket interposed between the ring and the ball valve being mounted about said access control opening.

18. In a mixer valve in accordance to claim 17 further comprising:

said regulation ring having a mounting means for mounting a plate device that is constructed for limiting the control field of the valve.

19. In a ball valve for a mixer valve, said ball valve comprising:

a substantially spherical shaped valve surface;

a plurality of openings in said valve surface and in fluid communication with each other;

a first projection extending from said valve surface and located at a fixed location on said valve surface for driving said ball valve when mounted in a valve body;

a second projection extending from said valve surface and located at a fixed location on said valve surface for constraining motion of said ball valve when mounted in a valve body; and said second projection being formed by a pin passing through said ball comprising having at least one distal end positioned to the exterior of the spherical valve surface.

20. In a ball valve as defined in claim 19 further comprising:

said pin being rigidly affixed to said ball valve.

21. In a ball valve as defined in claim 19 further comprising:

said second projection being positioned perpendicular to said first projection and extending from said ball substantially at 90 degrees from the position of said first projection.

22. In a ball valve as defined in claim 21 further comprising:

said second projection formed by a pin passing through said ball valve and centrally positioned to pass through the center of said ball valve and being perpendicular to said first projection; and said pin having at least one distal end positioned to the exterior of the spherical valve surface.

23. A ball valve cartridge for a mixer valve comprising:

a lower body member and upper body member constructed to be connected together;

said lower body member having an internal partially spherical valve surface which forms a ball valve receiving cavity in conjunction with said upper valve body member;

said lower body member having at least two straight inlet ports therethrough, said ports being positioned below the center of said ball valve and each having a longitudinal axis intersecting the center of said ball valve cavity; and said lower body member having a lower outer surface with a contour and positioned such that said axes of said straight inlet ports intersect said contour at a perpendicular angle.

24. In a ball valve cartridge for a mixer valve as defined in claim 23 further comprising:

said lower outer surface being frustum shaped; and said inlet ports being straight and free of bends in said lower body member.

25. In a ball valve cartridge for a mixer valve as defined in claim 24 further comprising:

said lower and upper body members define a slot at a junction therebetween; and said slot sized to receive a distal end of a pin extending from a ball valve when seated in said ball valve receiving cavity.

26. In a ball valve cartridge for a mixer valve as defined in claim 25 further comprising:

a ball valve member having a control stem extending outwardly therefrom and through a control opening in said upper body member; and said ball valve member having a pin extending therefrom at a substantially perpendicular position from said control stem and being received in said slot of said cartridge.

27. In a ball valve cartridge for a mixer valve as defined in claim 26 further comprising:

said pin being affixed to said ball valve member; and said distal end of said pin being circular in cross section to be pivotable in said slot.

28. In a mixer valve for liquids having a ball valve pivotably mounted in a valve receiving cavity of a housing, said housing having a plurality of ports in fluid communication with said cavity, said ball valve having a plurality of openings in an outer at least partially spherical valve surface, said openings cooperating with said ports to control liquid flow through said ports, said valve housing having a control opening therethrough with a longitudinal axis of said valve housing passing through said control opening, said ball valve having a first projection in the form of a control stem connected thereto and extending through said control opening, the improvement comprising:

means affixed to the valve housing and ball valve and cooperating with each other for constraining pivotable motion of the ball valve with respect to the valve housing about said longitudinal axis of said housing and about an axis of said ball valve that is perpendicular to said longitudinal axis without the addition of any third member that is movable with respect to both the ball valve and housing.

29. In a mixer valve as defined in claim 28 further comprising:

stop means for limiting the pivotable motion about the two axes.

30. In a ball valve as defined in claim 19 further comprising:

said plurality of openings in communication with a substantially hollow interior of said ball valve; and said pin extending through said hollow interior.

31. In a ball valve as defined in claim 30 further comprising:

said substantially spherical shaped valve surface comprising a first and second drawn halves being welded together along opposing edges thereof;

each half having a mating edge with a pair of diametrically opposed semi-circular notches such that when the first half is mated with the second half, holes are formed that receive said pin therethrough.

32. A mixing valve for a faucet characterized by:

a faucet body having a cartridge receiving chamber;

a replaceable cartridge being seated in the chamber of the faucet body, said cartridge having a ball valve receiving cavity;

a ball valve pivotably mounted in the ball valve receiving cavity of said cartridge;

said cartridge having at least two inlet ports passing straight therethrough and free of bends with each port having a longitudinal axis intersecting the center of said ball valve cavity;

said cartridge having a lower outer surface with a contour and positioned such that said axes of said inlet ports intersect the lower surface contoured at a perpendicular angle;

said faucet body having fluid inlets passing therethrough and having a surface complementarily shaped with respect to the lower surface of the cartridge such that the axes of each fluid inlet is angled at a non-perpendicular angle with respect to the complementarily shaped surface of the faucet body and seats the cartridge lower surface;

said fluid inlets of the faucet body being in fluid communication with respective inlet ports in the cartridge with a seal being positioned about a respective inlet port at a junction of the faucet body with the cartridge to form inlet passages that are bent at the junction of the faucet body with the cartridge.

33. A mixing valve as defined in claim 32 further comprising:

said cartridge being formed by a upper body member and a lower body member constructed to be connected together;

said lower and upper body members define a slot at a connection line therebetween;

said slot sized to receive a distal end of a pin extending from said ball valve when seated in said ball valve receiving cavity.

* * * * *